(12) United States Patent
Kolb et al.

(10) Patent No.: US 7,539,903 B2
(45) Date of Patent: May 26, 2009

(54) METHOD FOR MONITORING THE EXECUTION OF A PROGRAM BY COMPARING A REQUEST WITH A RESPONSE AND INTRODUCING A FALSIFICATION IN A RESPONSE

(75) Inventors: Rüdiger Kolb, Dalheim (DE); Uwe Platzer, Bad-Soden (DE); Dietmar Schmid, Villmar (DE)

(73) Assignee: Siemens Aktiengesellschaft, Müchen (DE)

( * ) Notice: Subject to any disclaimer, the term of this patent is extended or adjusted under 35 U.S.C. 154(b) by 0 days.

(21) Appl. No.: 10/562,741

(22) PCT Filed: Jun. 1, 2004

(86) PCT No.: PCT/EP2004/050979

§ 371 (c)(1),
(2), (4) Date: Dec. 29, 2005

(87) PCT Pub. No.: WO2005/001690

PCT Pub. Date: Jan. 6, 2005

(65) Prior Publication Data

US 2006/0150033 A1     Jul. 6, 2006

(30) Foreign Application Priority Data

Jun. 30, 2003    (DE) ................ 103 29 501

(51) Int. Cl.
G06F 11/00      (2006.01)
G06F 11/277    (2006.01)
(52) U.S. Cl. .............. 714/41; 714/735; 714/736

(58) Field of Classification Search ............ 714/40, 714/11, 41, 735, 736
See application file for complete search history.

(56) References Cited

U.S. PATENT DOCUMENTS 4,532,594 A * 7/1985 Hosaka et al. .............. 701/114

(Continued)

FOREIGN PATENT DOCUMENTS

EP         0 461 792         12/1991

OTHER PUBLICATIONS

Wikipedia's Global Positioning System revision from May 22, 2003 found at http://en.wikipedia.org/w/index.php?title=Global_Positioning_System&oldid=1013568&printable=yes.*

(Continued)

*Primary Examiner*—Gabriel L Chu
*Assistant Examiner*—Joseph Schell
(74) *Attorney, Agent, or Firm*—Cohen Pontani Lieberman & Pavane LLP

(57) ABSTRACT

The invention relates to a method for monitoring the execution of a program in a microcomputer of an electronic device, especially a sensor circuit for motor vehicles. According to the inventive method, the program processes input data and produces output data, copies a program in addition to the program which is executed, said copy being stored in an address area in the micro-computer other than the program, using the input data provided for the program. The output data of the copy is compared to the data of the program and an error message is produced if the programs are not consistent.

5 Claims, 3 Drawing Sheets

U.S. PATENT DOCUMENTS

| | | | |
|---|---|---|---|
| 5,029,071 A | | 7/1991 | Kinoshita |
| 5,157,780 A | * | 10/1992 | Stewart et al. ............... 714/31 |
| 5,347,649 A | * | 9/1994 | Alderson .................... 719/312 |
| 5,551,047 A | | 8/1996 | Mori et al. |
| 5,617,429 A | * | 4/1997 | Goto ......................... 714/736 |
| 5,980,081 A | * | 11/1999 | Watari et al. ................. 700/79 |
| 6,161,196 A | * | 12/2000 | Tsai ............................ 714/10 |
| 6,654,914 B1 | * | 11/2003 | Kaffine et al. ................. 714/43 |
| 7,020,803 B2 | * | 3/2006 | Wolin et al. ................... 714/41 |
| 7,089,456 B2 | * | 8/2006 | Gender ........................ 714/41 |
| 7,185,233 B2 | * | 2/2007 | Bowers et al. ............... 714/41 |
| 2003/0233635 A1 | * | 12/2003 | Corrie ........................ 717/124 |

OTHER PUBLICATIONS

Wikipedia's Memory Hierarchy revision from Oct. 25, 2002 found at http://en.wikipedia.org/w/index.php?title=Memory_hierarchy&oldid=1747239&printable=yes.*

Wikipedia's Error Message found at http://en.wikipedia.org/w/index.php?title=Error_message&printable=yes.*

A software-based concurrent error detection technique for power PC processor-based embedded systems by Fazeli, Farivar and Miremadi Published: Oct. 3-5, 2005 in the 20th IEEE International Symposium on Defect and Fault Tolerance in VLSI Systems ISBN: 0-7695-2464-8.*

* cited by examiner

METHOD FOR MONITORING THE EXECUTION OF A PROGRAM BY COMPARING A REQUEST WITH A RESPONSE AND INTRODUCING A FALSIFICATION IN A RESPONSE

CROSS-REFERENCE TO RELATED APPLICATIONS

This is a U.S. national stage of application No. PCT/EP2004/050979, filed on 1 Jun. 2004. Priority is claimed on the following application(s): Country: Germany, Application No.: 103 29 501.1, Filed: 30 Jun. 2003.

BACKGROUND OF THE INVENTION

The invention relates to a method for monitoring the program execution in a microcomputer in an electronic appliance, particularly a sensor circuit for motor vehicles, where the program processes input data and generates output data.

In electronic appliances which are equipped with a microcomputer, faults in the microcomputer, particularly in the case of erroneous program execution, can result in failures and malfunctions. In the case of sensor circuits for motor vehicles and other safety-related appliances, such errors can result in threats, which need to be avoided with a very high level of certainty.

SUMMARY OF THE INVENTION

It is therefore an object of the present invention to monitor the program execution in a microcomputer as fully and certainly as possible and hence to use a suitable alarm signal to inform users or to initiate countermeasures in connected systems.

This object is achieved in a first embodiment of the invention in that in addition to the execution of the program a copy of the program, which is stored in a different address area than the program in the microcomputer, is executed with the input data intended for the program, and in that the output data from the copy are compared with those from the program and an error message is generated if they do not match. This embodiment takes account of the fact that in an inherently sound program a hardware-related error during the execution of the program does not also occur for an identical program.

With one development, the copy of the program can be checked by virtue of further execution of the copy being provided which involves processing prescribed test data, in that the output data from the further execution of the copy are compared with comparative data stored in a memory, and in that an error message is generated if they do not match.

To be able to inspect the overall execution of the program, including the program used for monitoring, one development of the inventive method has provision that following the execution of the program and following the execution of program portions which are used to perform the inventive method a respective flag is set or changed, and that an error message is generated if not all the flags have been set or changed.

A second embodiment of the invention is used for monitoring the program execution in at least two interconnected microcomputers in an electronic appliance, particularly a sensor circuit for motor vehicles, and consists in that one of the microcomputers generates a request which is transmitted to the other microcomputer and there uses prescribed input data to prompt the execution of a program, in that a response which is dependent on the output data is returned to the one microcomputer, and in that the one microcomputer compares the request and the response with one another. In this case too, provision may again be made for the program to be a copy of a program which performs the actual function of the other microcomputer.

In the second embodiment of the invention, both monitoring of that computer in which said program is running and inspection of the monitoring are possible by virtue of the response being falsified from time to time, which the other microcomputer first of all identifies as an error in the one microcomputer, but which the one microcomputer expects and checks.

In this case too, the program execution can be inspected in that following the execution of the program and following the execution of program portions which are used for performing the inventive method a respective flag is set or changed, and in that an error message is generated if not all the flags have been set or changed, and again the inspection function of the other computer is monitored by virtue of the content of the flag register being falsified from time to time, which the other microcomputer first of all identifies as an error in the one microcomputer, but which the one microcomputer expects and checks.

Since the respective other computer cannot distinguish between errors during the program execution and the errors intentionally introduced from time to time, one development has provision that an error counter in one of the microcomputers counts errors which have been detected for the respective other microcomputer, and that if an incorrect response and/or a falsification in the flag register is/are added then the counter reading of the error counter in that microcomputer in which the incorrect response or the falsification in the content of the flag register was/were added is not changed.

BRIEF DESCRIPTION OF THE DRAWINGS

The invention permits numerous embodiments. Two of these are shown schematically in the drawing with reference to a plurality of figures and are described below. In the drawing.

DETAILED DESCRIPTION OF THE PREFERRED EMBODIMENTS

In connection with the exemplary embodiments, the program is also called a software routine.

Figure 1:
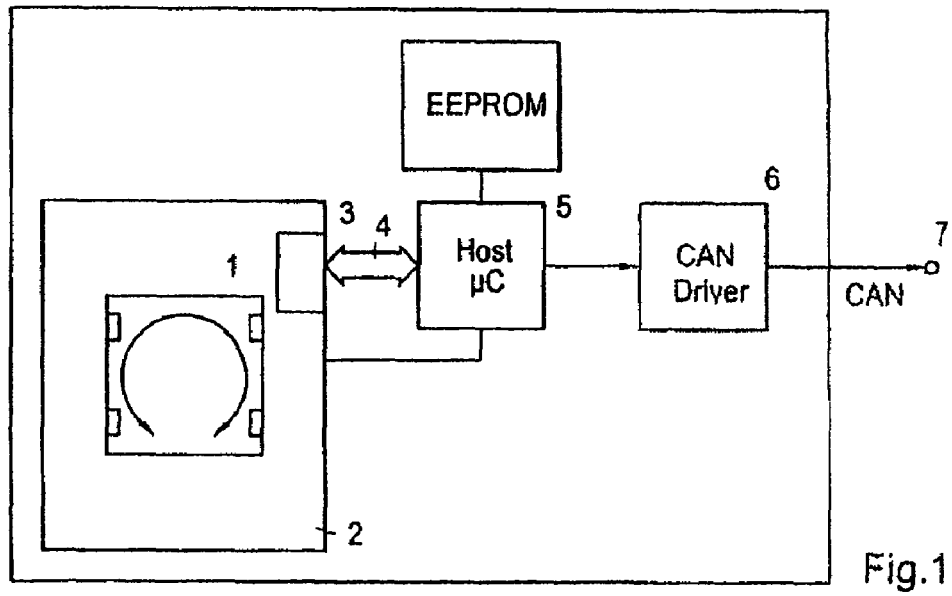
FIG. 1 is a block diagram of an application embodiment in which the inventive method is implemented.

The application example shown in FIG. 1 is a rotation rate sensor for a motor vehicle, with a vibrational gyroscope 1, which is part of a sensor module 2. The latter has a series of circuits for operating the vibrational gyroscope and for evaluating the signals from the vibrational gyroscope, including a microcomputer 3, inter alia. The latter is connected via an SPI bus 4 to a further microcomputer 5, which is subsequently also called a host. From this, the rotation rate information passes via a CAN bus driver 6 to a CAN bus 7 for forwarding to other systems in the motor vehicle.

Since it is not required in order to understand the invention, a more detailed explanation of the vibrational gyroscope 1 and of the sensor module 2 is not given. The safety relevance of the rotation rate sensor means that there is provision for correct operation of the microcomputers 3, 5, particularly the program execution, to be monitored.

Figure 2:
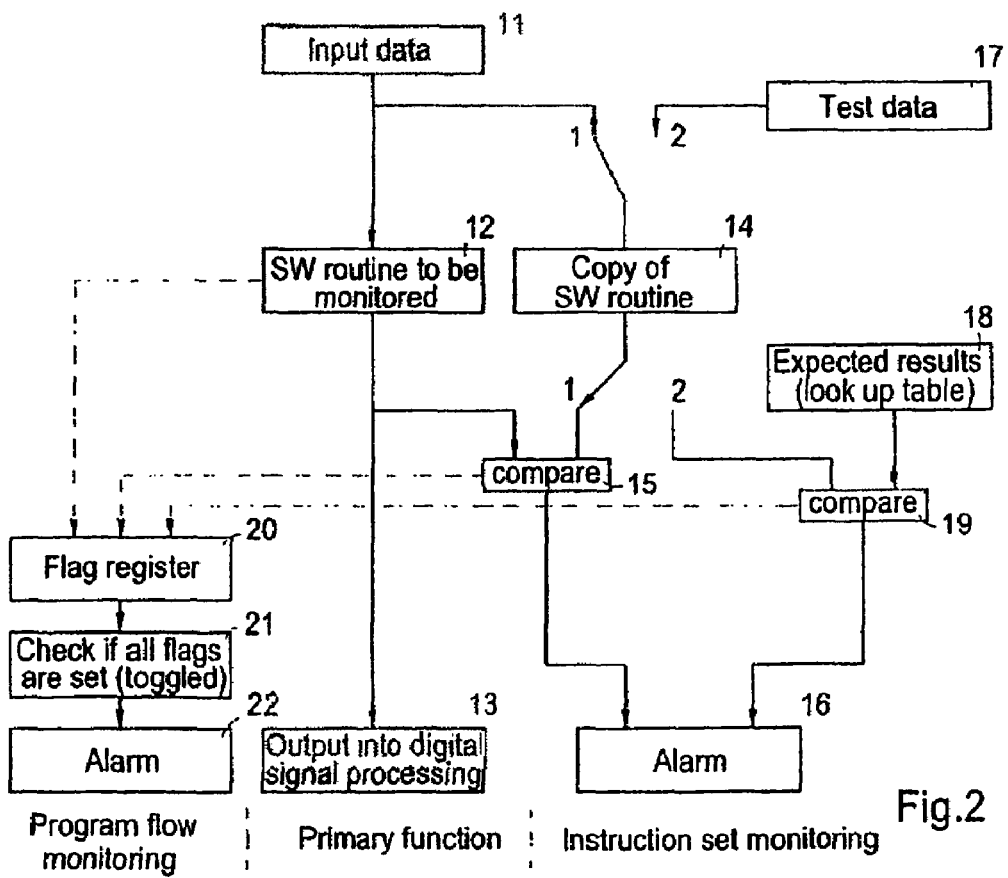
FIG. 2 is an illustration of various functions for monitoring the program execution in a microcomputer.

In the example shown in FIG. 2, those functions which are used for the actual operation of the microcomputer (primary function) are shown as rectangles. At 11, input data are read—for example from the circuits of the sensor module 2 which are indicated in FIG. 1—and are processed at 12 in the software routine which is to be monitored. The results of this program execution are output at 13—ultimately onto the CAN bus 7 in the case of FIG. 1. The microcomputers in question normally operate with a series of software routines, which complement one another to form a program system. FIG. 2 shows the monitoring of a routine, which is particularly important when a plurality of routines are provided. The inventive method can also be used to monitor a plurality of routines, however.

The microcomputer 3, 5 (FIG. 1) stores, apart from the software routine which is to be monitored, a copy of the software routine—subsequently called the copy—in another address area. To check correct program execution of the original routine, in a first step the copy is executed with the same input data at 14. The output data from this program execution are compared with the output data from the original routine at 15. If they differ, an alarm is triggered at 16.

In a further step, program execution of the copy is effected with test data 17. The output data from this program execution are compared with stored expected results, which are stored in a lookup table 18, at 19. If differences arise here, an alarm is likewise triggered at 16.

To monitor whether the monitoring illustrated in FIG. 2 is actually taking place, provision is made for performance of the program execution for the original routine at 12 and performance of the comparisons at 15, 19 to be followed by flags being set in a register 20. At 21, a check is then performed to determine whether all the flags have been set. If this is not the case, an alarm is triggered at 22.

Figure 3:
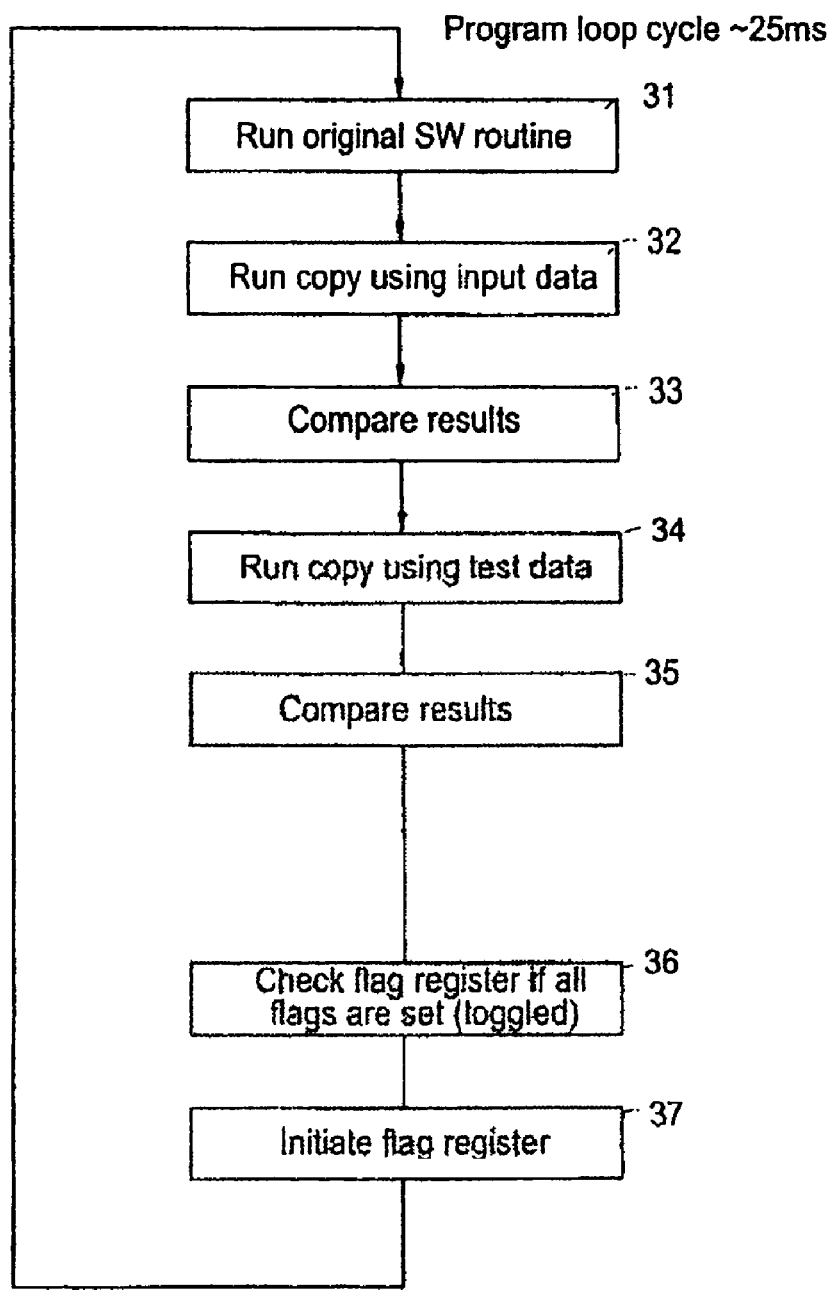
FIG. 3 is a flowchart for a program for implementing the functions FIG. 2.

FIG. 3 shows the monitoring program already explained with reference to FIG. 2 as a flowchart, which is repeated every 25 ms, for example. In this case, a first program step 31 first of all involves the original routine being executed, followed by the copy at 32, and at 33 the results are compared. In program step 34, the copy is then executed with the test data. The results of the program execution 34 are then compared with one another at 35. At 36, a check is performed to determine whether all the flags have been set, and at 37 the flag register is then initialized, i.e. reset, if the flags are being set, as explained in connection with FIG. 2. Alternatively, toggling can be performed instead of setting the set.

Figure 4:
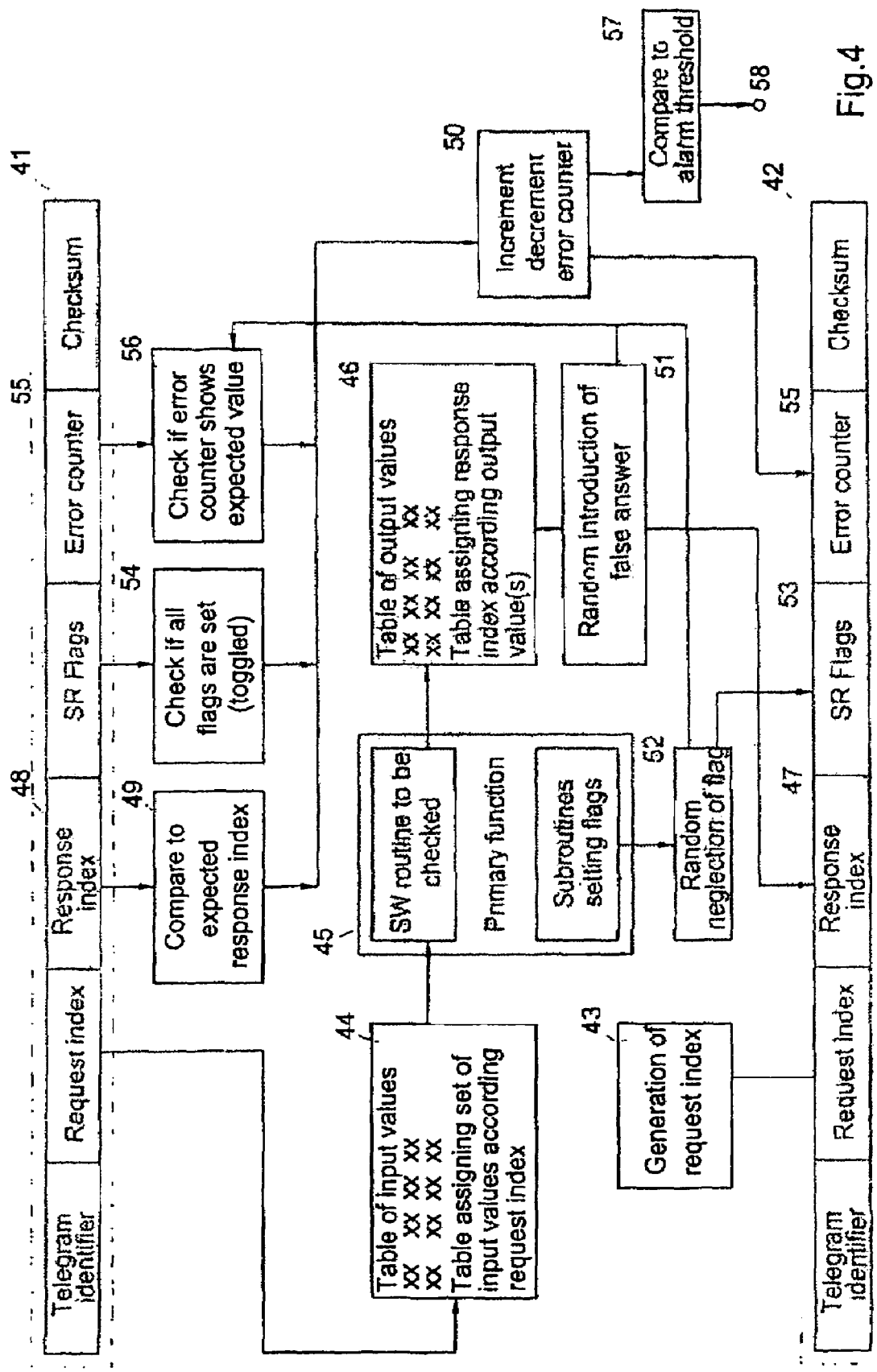
FIG. 4 is a block diagram of the reciprocal monitoring of two microcomputers.

FIG. 4 is used to explain the reciprocal monitoring of two microcomputers 3, 5 (FIG. 1). The elongate rectangles 41, 42 represent data telegrams on the SPI bus 4 (FIG. 1), each with an identifier, a plurality of user data words and a checksum. The structure which is also shown is present on the two microcomputers which are monitoring one another.

To check the respective other microcomputer, the one computer generates a request (Request index) at 43 and this request is transmitted via the SPI bus 4 to the other microcomputer. There, input data for the software routine which is to be checked are read from a table 44. These data are transferred to a program 45 which essentially contains parts 11 to 15 of the illustration shown in FIG. 2, i.e. in this component the other microcomputer performs its primary function and also executes a copy of the software routine.

The output data from the software routine are converted in a further table 46 into a response (Response index), which is transmitted to the one microcomputer (see data word 47 in the data telegram 42). Expediently, the request and the response contain only a respective index stating which input data stored in the table 44 are to be used for the software routine which is to be checked or which data in the table 46 are the ones to which the calculated output data correspond.

The other microcomputer receives a response (data word 48 in the data telegram 41) and compares this response at 49 with the expected response. If the two match, it is assumed that the other microcomputer is operating correctly in this respect. If discrepancies arise, however, an error counter 50 is incremented. From time to time, errors are introduced into the output data from the table 46, that is to say into the response, which result in an incorrect response 47 even if the copy 14 is being executed correctly.

However, that microcomputer which receives the incorrect response cannot identify whether this is a subsequently introduced error or an error as a result of incorrectly performed program execution. In a similar manner, the flags described in connection with FIG. 2 are suppressed at 52. The flags (called SR flags in FIG. 4) are introduced into the data telegram 42 at 53. In the case of the other program from the microcomputer in program part 54, they result in an error message if they have not all been set or toggled.

In addition, the counter reading on the error counter 50 is added to the data telegram 42 as a further data word 55. The microcomputer can take the data word 55 from the data telegram 41 and can check at 56 whether the counter reading corresponds to the expected value. If this is not the case, an error message is likewise transmitted to the error counter 50. The function 56 receives messages from the functions 51, 52 if the respective data have been falsified, so that this is taken into account for the comparison between the transmitted counter reading and the expected counter reading. This allows the functions 51 and 52 to implement the monitoring by the other microcomputer correctly. The counter reading on the counter 50 is checked at 57 to determine whether a prescribed threshold value has been reached. If this is the case, an alarm is triggered at 58.

What is claimed is:

1. A method for monitoring program execution in at least two interconnected microcomputers in a sensor circuit sensing at least one operating parameter of a motor vehicle, comprising the steps of:

generating, by one of the microcomputers in the sensor circuit, a request which is transmitted to the other microcomputer in the sensor circuit;

using, by the other of the microcomputers, prescribed input data to prompt the execution of a program in response to receipt of the request;

returning, by the other of the microcomputers, a response which is dependent on the input data to the one of the microcomputers;

comparing, in the one of the microcomputers, the request and the response with one another;

generating an error message if the request does not match the response;

one of setting or changing, within the other of the microcomputers, a respective flag in a flag register following the execution of program portions of the program, and generating an error message if not all the flags have been set or changed following the execution of the program;

introducing a falsification, by the other of the microcomputers, in the flag register;

identifying, by the other of the microcomputers, the falsification as an error in the response provided to the one of the microcomputers; and checking, by the one of the microcomputers, for the falsification.

2. The method of claim 1, wherein the program is a copy of another program that performs a function of the other of the microcomputers.

3. The method of claim 1, further comprising the steps of counting errors using an error counter in the one of the microcomputers which have been detected for the other of the microcomputers; and not changing the error counter for errors caused by the falsifications in the flag register by the other of the microcomputers.

4. A method for monitoring program execution in at least two interconnected microcomputers in a sensor circuit for motor vehicles, comprising the steps of:

generating, by one of the microcomputers, a request which is transmitted to the other microcomputer;

using, by the other of the microcomputers, prescribed input data to prompt the execution of a program in response to receipt of the request;

returning, by the other of the microcomputers, a response which is dependent on the input data to the one of the microcomputers;

comparing, in the one of the microcomputers, the request and the response with one another;

generating an error message if the request does not match the response;

introducing a falsification, by the other of the microcomputers, in the response;

identifying, by the other of the microcomputers, the falsification as an error in the response provided to the one of the microcomputers; and checking, by the one of the microcomputers, for the falsification.

5. The method of claim 4, further comprising the steps of counting errors, using an error counter in the one of the microcomputers, which have been detected for the other of the microcomputers; and not changing the error counter for errors caused by the falsifications introduced by the other of the microcomputers in the response.

\* \* \* \* \*